United States Patent
Pflug et al.

(10) Patent No.: US 11,078,628 B2
(45) Date of Patent: Aug. 3, 2021

(54) MULTILAYER PAPER CONTAINING WASTEPAPER AND GRASS FIBERS

(71) Applicants: Papierfabrik Meldorf GmbH & Co. Kommanditgesellschaft, Tornesch (DE); Hans Wehrmann, Grünwald (DE)

(72) Inventors: Martin Pflug, Haselau (DE); Hans Wehrmann, Grünwald (DE)

(73) Assignee: PAPIERFABRIK MELDORF GMBH & CO. KOMMANDITGESELLSCHAFT

( * ) Notice: Subject to any disclaimer, the term of this patent is extended or adjusted under 35 U.S.C. 154(b) by 29 days.

(21) Appl. No.: 16/735,735

(22) Filed: Jan. 7, 2020

(65) Prior Publication Data
US 2020/0224368 A1 Jul. 16, 2020

(30) Foreign Application Priority Data
Jan. 15, 2019 (EP) .................................. 19151777

(51) Int. Cl.
| | | |
|---|---|---|
| D21H 15/10 | (2006.01) | |
| D21F 9/00 | (2006.01) | |
| D21H 11/12 | (2006.01) | |
| D21H 11/14 | (2006.01) | |
| D21H 27/38 | (2006.01) | |

(52) U.S. Cl.
CPC ............ *D21H 15/10* (2013.01); *D21F 9/006* (2013.01); *D21H 11/12* (2013.01); *D21H 11/14* (2013.01); *D21H 27/38* (2013.01)

(58) Field of Classification Search
USPC ......................................................... 162/129
See application file for complete search history.

(56) References Cited

U.S. PATENT DOCUMENTS

| | | |
|---|---|---|
| 4,726,863 A | 2/1988 | Cline |
| 2009/0197089 A1 | 8/2009 | Klippert |
| 2014/0093705 A1 | 4/2014 | Shi |

FOREIGN PATENT DOCUMENTS

| | | |
|---|---|---|
| DE | 102008053858 | 5/2010 |
| DE | 102011005540 | 9/2012 |
| DE | 202012002588 | 6/2013 |
| DE | 102012107193 | 9/2013 |
| DE | 102013114386 | 6/2015 |
| DE | 202018104195 | 7/2018 |
| EP | 2224059 | 9/2010 |
| WO | 2013135632 | 9/2013 |
| WO | 2016123701 | 8/2016 |
| WO | 2018229333 | 12/2018 |

*Primary Examiner* — Mark Halpern
(74) *Attorney, Agent, or Firm* — Sand, Sebolt & Wernow Co., LPA

(57) ABSTRACT

A paper (10) is disclosed, especially for use in the production of corrugated cardboard. The paper (10) is formed from at least two layers couched together and having different composition and it contains wastepaper fibers and grass fibers. The special feature of the paper is that a first layer of the paper (10) is formed as a support layer (11) and contains a maximum fraction of 30 wt. % of grass fibers, a second layer of the paper (10) forms a top layer (12) with a minimum fraction of 20 wt. % of grass fibers and a maximum fraction of 80 wt. % of wastepaper fibers, and the fraction of grass fibers in the top layer (12) is higher than the fraction of grass fibers in the support layer (11).

26 Claims, 1 Drawing Sheet

MULTILAYER PAPER CONTAINING WASTEPAPER AND GRASS FIBERS

TECHNICAL FIELD

The invention relates to a multilayer, especially a two-layer paper, especially for use in the production of corrugated cardboard, wherein the paper is formed from at least two layers couched together and having different composition and wherein the paper contains wastepaper fibers and grass fibers. The invention moreover relates to a method for the production of such a paper.

BACKGROUND

Background Information

In paper making, two different kinds of fibers have long been used in order to produce from them a fiber composition, or so-called pulp, which is then placed in a thin layer on a screen and dewatered, detached from the screen as a web, and further dewatered and finally dried in order to make the finished paper. These fibers are, on the one hand, so-called virgin fibers, which are obtained from fresh cellulose, typically wood shavings or wood chips, and broken up to such an extent as to form fibrils, with which they later enter into a firm connection with each other in the paper. Furthermore, wastepaper fibers are also used in paper making, i.e., fibers which have been recovered from wastepaper obtained from recycling channels. The use of wastepaper fibers is advantageous from environmental standpoints, since it enables a second cycle or even many further cycles of the fiber material. On the one hand, the wastepaper can be reused as a valuable raw material, and on the other hand fewer virgin fibers are needed for the paper making, so that less wood has to be removed from nature.

However, the problem with wastepaper fibers is that these are generally smaller than the virgin fibers and therefore produce a worse binding within the paper, especially when they have already gone through the recycling process several times, and therefore they produce a lower tear strength of the paper.

Therefore, oftentimes in the past wastepaper fibers have been blended with virgin fibers in order to reuse the wastepaper on the one hand, and on the other hand to obtain an adequate tear strength of the resulting paper material.

At present, the accruing wastepaper is sorted definitely into different grades. Thus, for example, one distinguishes between:

- recycled kraft cardboard or kraft paper previously produced from virgin fibers, containing especially long cellulose fibers,
- traditional paper or carton, coming from commercial wastes,
- unprinted white paper (such as trimmings of unprinted paper from book printing, coming from printing plants or book binderies),
- trimmings of white paper printed with only slight ink, and
- mixed wastepaper from household and commercial wastes.

This circumstance has led in particular to the fact that at present it is possible to produce paper not only from pure wastepaper that not only meets the requirements placed on it for its properties, such as those in regard to the tear strength, but also that is technologically manageable to the extent that different grades can be produced with particular properties. Paper made from pure wastepaper is used for example to produce corrugated cardboard from it at a corrugated cardboard factory. It is also known how to produce multilayered, such as two-layered paper, with two or more paper layers couched together and having different composition and properties from such wastepaper, even wastepaper without the use of virgin fibers, especially 100% wastepaper. For example, a visible layer, or top layer, can be made of white wastepaper, in order to produce an optically attractive and suitable layer for later printing on this layer; a backing layer, on which the visible layer or top layer is placed, possibly with one or more intermediate layers in between, may consist of plain brown wastepaper, not needing to satisfy any high optical requirements. This is favorable, for example, since white wastepaper is a high-priced raw material as compared to brown wastepaper, the consumption of which is reduced in a multilayer, especially a two-layer production of the paper. An intermediate layer (or also several intermediate layers) can be provided in particular in order to prevent the backing layer from showing through the top layer.

WO 2018/229333 A1 relates to a special procedure in the making of multilayered paper.

Basically, it is furthermore known how to use grass fibers in paper making in addition to wastepaper and virgin fibers, generally as an admixture to virgin fibers and/or wastepaper fibers. Grass fibers are fibers which are obtained by an appropriate treatment from dried, half-dried or fresh sweet grass and/or sedges and/or seaweeds and/or algae. Since these fibers are much shorter compared to virgin fibers or wastepaper fibers and enter into much weaker bonds with each other in a paper layer, however, the production of paper from 100% of such fibers is not yet possible. But grass fibers, as already mentioned, are mixed in with the fiber compositions during paper making. As compared to virgin fibers, grass fibers have two benefits: on the one hand, they are cheaper than the virgin fibers. Given the present pricing structure, the price for one ton of virgin fibers is around 800 to 1000€ as compared to a price for one ton of grass fibers of around 300-400€. Furthermore, grass fibers are more environment friendly than virgin fibers, since they can be obtained from a significantly faster replenishing raw material. As compared to wastepaper fibers, the benefit is reduced solely to the environmental friendliness. Here, the grass fibers are superior to wastepaper fibers in environmental friendliness, because wastepaper fibers are often encumbered with ink residue, and thus they introduce chemicals, often petroleum-based chemicals, from the printing process into the paper making process, which are a burden to the process, especially to the waste water. However, no price advantage results, since given the current pricing structure wastepaper is still to be had much more cheaply than grass fibers (the current average price for one tone of wastepaper is around 80-140€).

Paper with a fraction of grass fibers is known, e.g., from DE 20 2018 104 195 U1. This describes in particular print media consisting of paper comprising grass fibers as well as cellulose fibers and/or scrap paper and having a Cobb60 value between 2.5 and 100 g/m2. US 2014/0093705 A1 discloses a corrugated cardboard having a cellulose-containing paper material in its top layer and a paper made without cellulose in a corrugated layer, formed with straw or red algae as the fiber material. Paper with added grass fibers is currently in high demand, especially on account of the environmental friendliness; thus, for example, by the packaging industry, where packages made from so-called grass paper, or paper provided with grass fibers, are also used in particular in the area of secondary packaging of organic foods. With this kind of paper, which has a greenish appearance on account of the added grass fibers on a visible layer, and sometimes allows the individual grass fibers to be recognized as particles, the customer recognizes the package made from this paper as being environmentally friendly and sustainable, so that the overall concept of environmentally friendly produced food and an environmentally friendly and sustainable packaging is harmonious. This holds especially when furthermore the actual support fibers of the paper are not virgin fibers, but instead a wastepaper fiber supporting the recycling notions.

Accordingly, the users of grass paper, especially those from the packaging industry, are constantly placing demands on the paper makers to increase the fraction of grass fibers in paper, especially that produced otherwise on the basis of wastepaper fibers, and/or furthermore to create visible surfaces with a large grass fraction which are optically appealing, easily printable, and clearly indicating the nature of a grass paper.

However, precisely in the area of the production of paper based on wastepaper fibers, an admixture of grass fibers is only possible to a limited extent, since the wastepaper fibers already have shorter fiber lengths and fibril density as compared to virgin fibers and thus produce a paper which is already less durable in terms of tear strength, so that the addition of grass fibers even further reducing the tear strength is limited in its amount.

SUMMARY

The inventors have now set themselves the task of finding an approach and increasing the fraction of grass fibers in a paper based on wastepaper fibers, or forming a visible surface clearly indicating a grass paper appearance in a paper with grass fraction.

According to the invention, this problem is solved by a paper, especially for use in the production of corrugated cardboard, wherein the paper is formed from at least two layers couched together and having different composition and wherein the paper contains wastepaper fibers and grass fibers, preferably only these two fiber types, and wherein the paper is characterized in that a first layer of the paper is formed as a support layer and contains a maximum fraction of around 30 wt. % of grass fibers and a second layer of the paper forms a top layer with a fraction of at least 20 wt. % of grass fibers and a fraction of at most 80 wt. % of wastepaper fibers. Furthermore, in the paper according to the invention the fraction of grass fibers in the top layer is higher, especially significantly higher, than the fraction of grass fibers in the support layer. In particular, the fraction of grass fibers in the top layer may be at least 5 wt. %, preferably at least 10 wt. %, especially at least 15 wt. % higher than the fraction of grass fibers in the support layer, which in the context of the invention can also be produced in particular without any admixture of grass fibers.

Thus, an at least two-layer system is deliberately created here, in which a first one of the layers forms a support layer, i.e., it provides for the stability and for important technological properties, such as the tear strength in particular, and in which a second one of the layers forms a top layer, which can be formed with a correspondingly increased fraction of grass fibers, since it does not itself need to form any stability supporting the system, but rather is supported by the support layer. This top layer may thus on the one hand contribute to increasing the overall fraction of grass fibers in the system, as compared to the lesser fraction of grass fibers in the support layer. On the other hand, especially also in addition, it may form an optically appealing visible side of the paper, especially emphasizing the grass paper appearance.

In particular, it has been found surprisingly that the layer forming the top layer with the high grass fiber fraction can not only be held stably in a paper making machine until such time as the couching with the layer forming the support layer occurs, but also that this layer with the high fraction of grass fibers can equally be connected sufficiently firmly to the layer forming the support layer, so that suitable cleavage strengths for the further processing and use of the paper can be achieved. In the context of the invention, the paper may also contain more than two layers, or for example one or more intermediate layer(s) may be provided between the support layer and the top layer. In this case, the couching of the top layer with the support layer is to be understood on the whole as a couching of the top layer with the intermediate layer(s), a couching of the intermediate layers with each other, and a couching of the intermediate layer facing toward the support layer with the support layer. If intermediate layers are used, these may also contain grass fibers and be based preferably at least for the most part on fibers obtained from wastepaper, but in any case have a slight, preferably a small, fraction of virgin fibers.

When indicating above and also in the following a fraction of the paper in wt. % it is meant that this fraction is measured as a fraction of a dry weight (after drying in an oven).

As the grass fibers there are used here fibers of sweet grasses and/or sedge and/or seaweeds and/or algae. These may be obtained from dried, half-dried, or fresh material. The grass fibers may be prepared for example as described in EP 2 825 699 A1 in order to be used in the fiber composition. However, it is not absolutely necessary for the grass material to be pelleted in one step of the method. The grass material can just as well be used as loose bulk material. A preparation of the grass for the obtaining of the grass fibers can furthermore be done according to DE 10 2013 114 386 A1. The fiber compositions used for the production of the two layers of the support layer and the top layer of the two-layer or multilayer paper may basically correspond for to that described in DE 10 2012 107 193 A1, while preferably for the paper according to the invention no virgin fibers are used, or only a slight fraction of virgin fibers, typically at most 10 wt. %, especially at most 5 wt. %.

As already mentioned, the support layer brings the required stability of the paper, so that it can comprise only a limited maximum fraction of grass fibers. This may be, for example, between 20 wt. % and 30 wt. %, but also less than this. Thus, the maximum fraction of grass fibers in the support layer may also be further limited to, e.g., 25 wt. % or 20 wt. %. As already mentioned, it is also conceivable for no grass fibers at all to be contained in the support layer or only slight fractions such as 5 wt. %, 10 wt. % or 15 wt. % or respectively only at most one fraction in the indicated amount. Accordingly, in one possible embodiment of the invention, a minimum fraction of wastepaper fibers in the support layer can be set at 70 wt. %, but also accordingly higher, especially also as the remaining amount to make up 100 wt. % respectively corresponding to the above indicated fractions of grass fibers, i.e., in an embodiment with no addition of virgin fibers. The fraction of grass fibers in the support layer will generally be established according to the requirements on the mechanical properties, especially the tear strength of the paper, on the one hand, and a total fraction of grass fibers to be established in the paper on the other hand. Insofar as a cost-effective paper is required, the fraction of grass fibers in the support layer will at present be chosen rather low, preferably at zero, since as mentioned above the price of wastepaper at present lies significantly below the price of grass material. If a change or even a reversal of the price trend should occur here, then of course a different prioritization may prevail and perhaps a higher fraction of grass fibers will also be desirable in the support layer, perhaps from a cost standpoint.

The top layer according to the invention should comprise the highest possible, but in any case a clearly higher fraction of grass fibers in order to increase the overall fraction of grass fibers in the paper and/or to give the top layer the appearance of a grass paper provided with a high fraction of grass fibers. However, the top layer also requires a fraction of other fibers, preferably wastepaper fibers, for a minimum strength, especially also in the production process. Accordingly, the maximum fraction of grass fibers, especially the actual fraction of grass fibers, may lie in a range between 30 wt. % and 70 wt. %. The minimum fraction of grass fibers in the top layer may be, e.g., 25 wt. %, 30 wt. %, 35 wt. % or even 40 wt. %, depending on the demand placed on the paper by the later consumer. For example, it is possible to incorporate fractions of grass fibers in the top layer reaching 40 wt. %, 50 wt. % or even 60 wt. % or up to such fractions as the maximum fraction. The remaining fraction is preferably filled up with wastepaper fibers.

For a further technological adjustment of the paper and also to obtain different properties of the surface having the support layer and the surface having the top layer, it may also be provided in particular that the two layers contain different kinds of wastepaper fibers. Thus, for example, wastepaper fibers obtained from white wastepaper may be contained in the top layer, in order to achieve good printable optics, and brown wastepaper fibers obtained from a more economical raw material may be contained in the support layer. But if a brown optics is desired, the top layer may also contain wastepaper fibers from brown wastepaper. The wastepaper fibers of the support layer may for example also be fibers obtained from kraft cardboard or kraft paper, giving the support layer an especially good strength. If such wastepaper fibers are chosen for the support layer, then an especially high fraction of grass fibers can also be integrated in the support layer, for example.

The paper according to the invention can be produced in particular as a paper web in a paper making machine. As already mentioned above, a paper is preferably produced that is employed for use in the further manufacturing of corrugated cardboard. For this purpose, but also for other purposes, it may have in particular a weight per unit area of 80 g/m2 to 200 g/m2, preferably of 125 to 175 g/m2.

Of this total grammage of the paper, which is mirrored in known manner in the thickness of the paper, typically the larger fraction, and often the much larger fraction, goes to the support layer. In the paper according to the invention, this may have in particular a weight per unit area of 60-170 g/m2. This ensures that the support layer can guarantee the adequate technological properties of the multilayer, especially two-layer paper. The top layer in the paper according to the invention may typically have a weight per unit area of 30-50 g/m2. In a typical multilayer, especially two-layer paper according to the invention, the top layer makes up around ¼ to ⅓ of the total thickness of the paper, and the support layer contributes around ⅔ to ¾ of the total thickness of the paper.

A firm connection of the couched layers is important for the paper according to the invention. Accordingly, it is preferred for the paper according to the invention to have a cleavage strength as determined by the international Scott bond test per DIN ISO 16260 of 180 to 300 J/m2, especially 220300 J/m2.

In order to achieve good printability of the top layer, it is preferable for the paper according to the invention to have a Cobb60 value, as determined by DIN EN ISO 535, of at most 40 g/m2, especially less than 35 g/m2, preferably less than 30 g/m2. The adjustment of the Cobb60 value, which is a measure of the water uptake of the paper, is done in the familiar way in paper making by an adding of glue and/or starch to the still wet or moist paper web prior to the drying, which is typically done by running across drying cylinders. For certain applications, a high absorptivity of the paper is demanded, i.e., a high Cobb60 value. This is required, e.g., for cellulose, i.e., the paper layer, which forms the intermediate layer in corrugated cardboard. For such a paper, higher Cobb60 values can then be adjusted, in particular it can be worked without any addition of glue or starch. A paper according to the invention can be produced in particular in a paper making machine. For this, at first the fiber materials used, i.e., the wastepaper fibers and the grass fibers here, are placed in known manner into separate pulpers, one for the material of the support layer and one for the material of the top layer. The grass fibers before being placed into the pulper can be treated in the manner known from the described prior art, in particular they can be ground up in fibrillating manner. Then, in the paper making machine, a first fiber composition which has been taken from a first of the pulpers, having been optionally sifted once more in additional separators, refiners, and/or vats and containing water, grass fibers in a maximum fraction of 30 wt. %, in terms of the dry weight, as well as wastepaper fibers, is placed on a first screen. This fiber composition forms a first layer, the support layer. In this fiber composition, the fraction of wastepaper fibers can be in particular at least 70 wt. %, in terms of the dry weight.

In parallel in the process, a second fiber composition which has been taken from a second of the pulpers, having been optionally sifted once more in additional separators, refiners, and/or vats and containing grass fibers in a minimum fraction of 20 wt. %, in terms of the dry weight, but in any case in a higher fraction of grass fibers than the first fiber composition, and which contains wastepaper fibers in a maximum fraction of 80 wt. %, in terms of the dry weight, is placed on a second screen. The webs formed on the two screens from the pulps, after an optional first dewatering, are brought together and couched to form a two-layer paper web. In the context of the invention, it may also be provided for a further web to be formed for example as an intermediate layer by a fiber composition placed on a further screen, which after an optional first dewatering is brought together with the two webs described above. Several such further webs may also be formed and brought together with the two above described webs. The two-layer or multilayer paper web so produced is then further dewatered and finally dried in a familiar manner in paper making, especially by a running through drying cylinders. The weblike paper so formed is finally wound up into a roll and may then be transported and used for further processing. In corresponding adapted adjustment of the weight fractions in the fiber compositions, a paper with the above described weight fractions of wastepaper fibers and grass fibers can then be achieved. In the manufacturing process, furthermore, a known processing of the reject and a recycling of the fibers obtained from the reject to the feedstock of the fiber composition are carried out.

The fractions of grass fibers and/or wastepaper fibers in the fiber compositions for the making of the two webs for the support layer and the top layer can be chosen according to the requirements and in particular with the weight fractions mentioned above in the course of the specification of the paper according to the invention.

A two-layer paper formed according to the invention, for example when it contains in the support layer 75 wt. % of wastepaper fibers and 25 wt. % of grass fibers and the support layer for a total weight per unit area of the paper of 150 g/m2 makes up a fraction of 110 g/m2, the top layer contributes 40 g/m2 to the weight per unit area and contains a fraction of grass fibers of 50 wt. %, may contain in total over 30 wt. % of grass fibers and furthermore exhibit adequate stability, especially tear strength. What is more, the top layer with the especially high fraction of grass fibers reveals the addition of this material especially well, and accordingly has an appearance emphasizing the attribute of the paper as being grass paper.

Thus, it is evident here that the invention provides a new kind of paper and a production process for it, which in the combination of wastepaper fibers and grass fibers enables the use of a high fraction of grass fibers in the use for the production of such a paper, without endangering the required technological properties, especially the stability and tear strength of the paper, and/or in which the side of the paper showing the top layer has an appearance revealing especially well the nature of the grass paper.

BRIEF DESCRIPTION OF THE SEVERAL VIEWS OF THE DRAWINGS

Further advantages and features of the invention will emerge from the following specification and from the referenced figures. There are shown.

DETAILED DESCRIPTION

Figure 1:
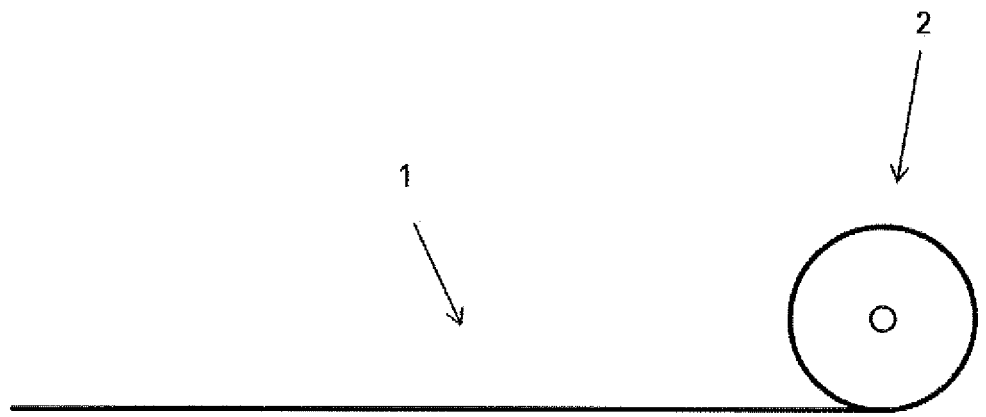
FIG. 1 a schematic representation of the production of a paper web containing grass fibers as a single web according to the prior art, and FIG. 2 a schematic representation of the production of a two-layer paper web according to the invention, composed of a support layer and a top layer containing grass fibers.

FIG. 1 first of all shows a traditional method for the production of a single-layer paper in highly schematic representation. A paper web 1 is produced in familiar manner in a paper making machine by placing pulp based on wastepaper onto a screen and by a first dewatering, as well as subsequent drying, and it is then wound up onto a paper roll. It is known here that a fraction of grass fibers is added to the paper so produced as a paper web 1, more precisely, to the fiber composition. However, the possible fraction of added grass fibers is limited, since grass fibers are even shorter than the already not particularly long fibers of the wastepaper, so that they may cause less strength in the fiber bonds of the paper. In order to achieve the required tear strength and other technological properties of the paper, the admixture of grass fibers in with a pulp mixture otherwise based on wastepaper for the paper making is limited, typically to a maximum of 20 to 30 wt. %.

Figure 2:
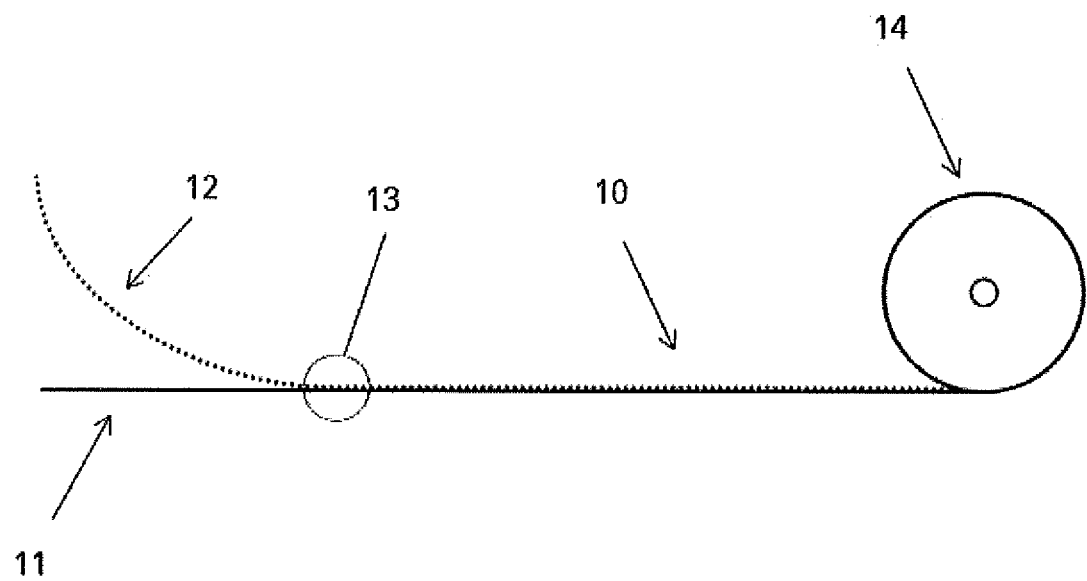

In order to meet the requirements of the consumers and users of such paper, who desire in particular on account of ecological considerations on the one hand a higher overall fraction of grass fibers in the paper and on the other hand also demand an appearance of the paper, or at least a visible or top surface, which clearly reveals the grass fibers contained in the paper, i.e., its "grass paper nature", the inventors have now created a different method for the production of such paper, which is shown schematically in FIG. 2.

Here, a paper web 10 is produced in multiple layers, in the present case two layers. For this, a first paper layer, or support layer 11, is formed by placing a first fiber composition on a first screen of a paper making machine, e.g., on a bottom wire. In parallel, a second paper layer, or top layer 12, is formed by placing a second fiber composition on a second screen of a paper making machine, e.g., on a top wire. The support layer 11 contains a high fraction of wastepaper fibers, e.g., wastepaper fibers in a fraction of at least 70 wt. %, in terms of the dry weight. The top layer 12 on the other hand is characterized by a high fraction of grass fibers, namely, at least 20 wt. % by dry weight. The fraction of grass fibers in the top layer 12 may in particular be between 30 and 70 wt. %. The support layer 11 may also contain grass fibers, the fraction of grass fibers being limited there to a maximum of 30 wt. %, preferably to a maximum of 25 wt. %, especially a maximum of 20 wt. %, and the fraction of grass fibers in the top layer 12 being in any case higher, especially significantly higher, than a fraction of grass fibers in the support layer 11. Preferably, the remainder of the dry weight in the support layer 11 is formed entirely by wastepaper fibers. However, it may also contain virgin fibers—but preferably only in a small fraction. Thus, the support layer 11 has a sufficiently stable formation, in order to guarantee the tear strength and also other qualities demanded of the paper of the paper web 10.

In the top layer 12, the fraction of fibers not formed by grass fibers is likewise realized entirely by wastepaper fibers, and here as well it may also contain a—preferably small—fraction of virgin fibers. The top layer 12 on account of the high fraction of grass fibers is not in itself sufficiently stable and as such it does not fulfill the technological properties demanded of the paper in the paper web 10.

By the merging of the two webs of support layer 11 and top layer 12 at position 13 and by the couching of the two webs here, the two-layer paper 10 is then obtained, having the demanded technological properties—primarily due to the properties of the support layer 11. This paper web 10, after further dewatering and drying, is typically wound up onto a paper roll 14.

The paper web 10 in particular may have a weight per unit area of 80 to 200 g/m2. The paper may be such, for example, as is used in a later use in the production of corrugated cardboard.

The support layer 11 in particular may have a weight per unit area of 60 to 170 g/m2, The top layer 12 in particular may have a weight per unit area of 30 to 50 g/m2. By an adjusting of the ratio of thicknesses, i.e., weights per unit area, of the support layer 11 and the top layer 12, an adjusting of the required technological properties and moreover also an adjusting of the fraction of grass fibers in the two-layer paper web 10 can be done (for preadjusted fractions of grass fibers in the top layer 12 and optionally also the support layer 11).

The two-layer paper web 10 preferably has a cleavage strength, determined by the international Scott bond test per DIN ISO 16260, of 180 to 300 J/m2, especially 220 to 300 J/m2.

For the top layer 12, a Cobb60 Wert per DIN EN ISO 535 of at most 40 g/m2, especially less than 35 g/m2, preferably less than 30 g/m2, is preferably adjusted. This is then maintained by a familiar adding of glue and/or starch.

In order to obtain a particular appearance of the top layer 12, it may be provided e.g. that the wastepaper fibers used there are obtained from white wastepaper. Especially in a white-base top layer the greenish grass fibers are especially evident and thus easily perceived by the observer of an end product made from the paper according to the invention, having the top layer 12 as a visible surface.

It has once again been made evident from the preceding specification what benefits are provided by the paper according to the invention and the method for its production. In particular, it is made clear that, on the one hand, the total fraction of grass paper fibers can be increased in a paper produced on the basis of wastepaper fibers and adjusted in a very broad manner, and that at the same time a top layer can be obtained, which may afterwards serve in particular as a visible surface, in which an especially high fraction of grass fibers is incorporated, having an appearance which accordingly reveals very well the "grass paper nature" of the paper.

LIST OF REFERENCE NUMBERS

1 Paper web
2 Paper roll
10 Paper web
11 Support layer
12 Top layer
13 Position
14 Paper roll

The invention claimed is:

1. A paper, especially for use in the production of corrugated cardboard, wherein the paper comprises at least two layers couched together and having different composition and wherein the paper contains wastepaper fibers and grass fibers, wherein a first layer of the at least two layers of the paper is formed as a support layer and contains a maximum fraction of 30 wt. % of grass fibers, a second layer of the at least two layers of the paper forms a top layer with a minimum fraction of 20 wt. % of grass fibers and a maximum fraction of 80 wt. % of wastepaper fibers, and the fraction of grass fibers in the top layer is higher than the fraction of grass fibers in the support layer.

2. The paper according to claim 1, wherein the fraction of grass fibers in the top layer is at least 5 wt. % higher than the fraction of grass fibers in the support layer.

3. The paper according to claim 2, wherein the fraction of grass fibers in the top layer is at least 10 wt. % higher than the fraction of grass fibers in the support layer.

4. The paper according to claim 2, wherein the fraction of grass fibers in the top layer is at least 15 wt. % higher than the fraction of grass fibers in the support layer.

5. The paper according to claim 1, wherein the fraction of grass fibers in the support layer is at most 25 wt. %.

6. The paper according to claim 5, wherein the fraction of grass fibers in the support layer is at most 20 wt. %.

7. The paper according to claim 1, wherein the fraction of grass fibers in the top layer is from about 20 wt. % up to about 70 wt. %.

8. The paper according to claim 1, wherein the minimum fraction of grass fibers in the top layer is 25 wt. %.

9. The paper according to claim 8, wherein the minimum fraction of grass fibers in the top layer is 30 wt. %.

10. The paper according to claim 8, wherein the minimum fraction of grass fibers in the top layer is 35 wt. %.

11. The paper according to claim 8, wherein the minimum fraction of grass fibers in the top layer is 40 wt. %.

12. The paper according to claim 1, wherein the support layer has a minimum fraction of wastepaper fibers of 70 wt. %.

13. The paper according to claim 1, wherein the paper contains no virgin fibers.

14. The paper according to claim 1, wherein the at least two layers contain different kinds of wastepaper fibers.

15. The paper according to claim 14, wherein the top layer contains wastepaper fibers obtained from white wastepaper and the support layer contains brown wastepaper fibers.

16. The paper according to claim 14, wherein the support layer contains wastepaper fibers of kraft paper or kraft cardboard.

17. The paper according to claim 1, wherein the paper has a weight per unit area of from about 80 g/m2 up to about 200 g/m2.

18. The paper according to claim 17, wherein the paper has a weight per unit area of from about 125 g/m2 up to about 175 g/m2.

19. The paper according to claim 1, wherein the support layer has a weight per unit area of from about 60 g/m2 up to about 170 g/m2.

20. The paper according to claim 1, wherein the top layer has a weight per unit area of 30 g/m2 to 50 g/m2.

21. The paper according to claim 1, wherein the paper has a cleavage strength determined by the International Scott bond test per DIN ISO 16260 of from about 180 J/m2 up to about 300 J/m2.

22. The paper according to claim 21, wherein the paper has a cleavage strength determined by the International Scott bond test per DIN ISO 16260 of from about 220 J/m2 up to about 300 J/m2.

23. The paper according to claim 1, wherein the paper has a Cobb60 value of the top layer per DIN EN ISO 535 of at most 40 g/m2.

24. The paper according to claim 23, wherein the paper has a Cobb60 value of the top layer per DIN EN ISO 535 of less than 35 g/m2.

25. The paper according to claim 23, wherein the paper has a Cobb60 value of the top layer per DIN EN ISO 535 of less than 30 g/m2.

26. A method for production of a paper with the following steps carried out in a paper making machine:
    placement of a first fiber composition containing water, grass fibers in a maximum fraction of 30 wt. % or less, in terms of the dry weight, as well as wastepaper fibers, in the form of a web on a first screen;
    placement of a second fiber composition containing water, grass fibers in a minimum fraction of 20 wt. % or less, in terms of the dry weight, as well as wastepaper fibers in a maximum fraction of 80 wt. %, in terms of the dry weight, in the form of a web on a second screen, wherein the second fiber composition has a higher fraction of grass fibers than the first fiber composition;
    couching of the webs formed on the first and second screens to produce an at least two-layer paper web; and
    drying of the paper web.

* * * * *